(12) United States Patent
Burstein et al.

(10) Patent No.: US 7,588,158 B2
(45) Date of Patent: Sep. 15, 2009

(54) ERGONOMIC HANDLE FOR FUEL CAP

(75) Inventors: Justin Burstein, Palo Alto, CA (US);
Steven A. Huber, Houston, TX (US);
Katie Strausser, Houston, TX (US);
John P. Thornton, Califon, NJ (US);
Matthew T. Ware, Pasadena, CA (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 87 days.

(21) Appl. No.: 11/968,451

(22) Filed: Jan. 2, 2008

(65) Prior Publication Data

US 2008/0173645 A1 Jul. 24, 2008

Related U.S. Application Data

(60) Provisional application No. 60/883,203, filed on Jan. 3, 2007.

(51) Int. Cl.
*B65D 25/28* (2006.01)
*B65D 55/14* (2006.01)
*B65D 55/02* (2006.01)

(52) U.S. Cl. .................. 220/212.5; 220/210; 220/756; 220/763; 16/430

(58) Field of Classification Search ............. 220/756, 220/212.5, 210, 755, 763; 16/430; D8/306
See application file for complete search history.

(56) References Cited

U.S. PATENT DOCUMENTS

| 2,570,818 | A | * | 10/1951 | Whitener et al. | 220/260 |
| 2,772,809 | A | * | 12/1956 | Ross | 220/318 |
| 3,173,570 | A | * | 3/1965 | De Pew | 220/301 |
| 3,302,826 | A | * | 2/1967 | Henchert et al. | 220/752 |
| 4,377,243 | A | * | 3/1983 | Shaw et al. | 220/210 |
| 4,892,216 | A | | 1/1990 | Scott | |
| D346,732 | S | * | 5/1994 | Riblett et al. | D8/306 |
| 5,370,232 | A | * | 12/1994 | Tiramani | 206/581 |
| 5,385,256 | A | * | 1/1995 | Brown | 220/323 |
| 5,743,425 | A | * | 4/1998 | Ellis | 220/254.2 |
| 5,845,800 | A | * | 12/1998 | Shaw et al. | 220/210 |
| 5,901,869 | A | * | 5/1999 | Ohmura et al. | 220/210 |
| RE36,959 | E | * | 11/2000 | Griffin | 220/210 |
| D442,844 | S | * | 5/2001 | Mirick | D8/301 |
| 6,245,229 | B1 | * | 6/2001 | Kool et al. | 210/232 |
| 6,457,596 | B1 | * | 10/2002 | Verseman | 215/387 |
| D469,331 | S | * | 1/2003 | Hansen | D8/306 |
| 7,322,218 | B2 | * | 1/2008 | Yonemura et al. | 70/162 |

(Continued)

*Primary Examiner*—Anthony D Stashick
*Assistant Examiner*—Niki M Eloshway
(74) *Attorney, Agent, or Firm*—Jeffrey P. Calfa; Mark C. Bach

(57) ABSTRACT

The ergonomic handle for a fuel cap pivotably engages to a top surface of the cap and is movable between a stowage position lying against part of the top surface of the cap and engaging against and activating a locking mechanism of the cap upon pivoting into such stowage position, and an upright functional position where the handle is pivoted to a position perpendicular to the cap. The handle comprises a planar, substantially A-shaped base section having a cutout therein overlying a lock of the locking mechanism of the cap and a horizontally disposed top rounded graspable grip section including indentations on an underside thereof for fingers and extended terminal end thumb tabs to aid in applying torque to the cap.

15 Claims, 3 Drawing Sheets

U.S. PATENT DOCUMENTS

| | | | |
|---|---|---|---|
| D572,999 S * | 7/2008 | Gulley | D8/306 |
| 2001/0002019 A1 * | 5/2001 | Thompson, III | 220/212.5 |
| 2001/0022620 A1 * | 9/2001 | Niwa | 348/231 |
| 2004/0256392 A1 * | 12/2004 | Hagano et al. | 220/304 |
| 2006/0000835 A1 * | 1/2006 | Wikstrom et al. | 220/288 |

* cited by examiner

ERGONOMIC HANDLE FOR FUEL CAP

CROSS REFERENCE TO RELATED APPLICATION

This application claims priority from provisional U.S. Application Ser. No. 60/883,203, filed Jan. 3, 2007 and entitled The Fueling Experience, the teachings of which are incorporated by reference.

BACKGROUND OF THE INVENTION

1. Field of the Invention

The present invention relates to an ergonomic handle for a fuel cap, and more particularly, for a locking fuel cap.

2. Prior Art

The aging driver faces a number of difficult activities in and around a truck, on a daily basis. With the number of older truck drivers substantially increasing over the next decade, removal and engagement, and locking and unlocking of a fuel cap must necessarily become less difficult. In this respect, the fuel cap on a truck is oversized, has no point of leverage for aiding in removal, is often held firmly in place by a vacuum created in the fuel tank, often has no means of locking same to prevent theft of fuel, and often does not provide means for venting, to undo the vacuum created within the tank. An older driver, with arthritis or hand or arm weakness, often requires assistance in removing such fuel cap.

At times a distal end of a fuel nozzle has been used to force the cap open, causing damage to the end of the fuel nozzle and fuel level sensor therein. Fuel nozzle damage is a problem for two reasons. First, the station must replace the nozzle so that the sensor works—at a cost of approximately $100. Second, a broken sensor cannot shut the pump off and thus the tank will overflow if the truck driver isn't paying attention. Depending on the size of the resultant fuel spill, it can cost up to $10,000-$15,000 to clean up.

There are products available for use in assisting in removal of gas caps of personal vehicles however no such tool is available for the large fuel caps found on trucks, to assist aging drivers in comfortably removing and tightening truck fuel caps.

In response to such difficulties in opening and closing the fuel tank, use of a pivoting handle with a large ergonomic grip is herein proposed; which secures the fuel from theft, upon being pivoted to a stowage position by engaging and activating a lock incorporated into the cap.

The proposed ergonomic handle provides for easy opening and is small enough to blend in with the original fuel cap, yet large enough to provide an ergonomic grip. The handle is rounded to provide a more natural shaped surface to grip and preferably has a rubber coating on it to prevent the hand from slipping by increasing friction and to aid the driver when the handle is cold or wet. It is also proposed to provide indentations for fingers and extended tabs for the thumb to aid in applying torque.

SUMMARY OF THE INVENTION

According to the invention there is provided an ergonomic handle fuel tank cap and more particularly for a locking fuel tank cap, the handle being pivotably engaged to upstanding flanges on a top surface of the cap and being lockably movable between a stowage position lying against a portion of the top surface of the cap and engaging against and activating a locking mechanism of the cap upon pivoting into such stowage position, and an upright functional position where the handle is positioned perpendicular to the top surface of the cap, the handle comprising a planar A-shaped base section having a cutout therein overlying a lock of the locking mechanism of the cap and a terminal rounded graspable grip section including indentations on an underside thereof for fingers and extended terminal end thumb tabs to aid in applying torque to the cap.

DESCRIPTION OF THE PREFERRED EMBODIMENT

Figure 1:
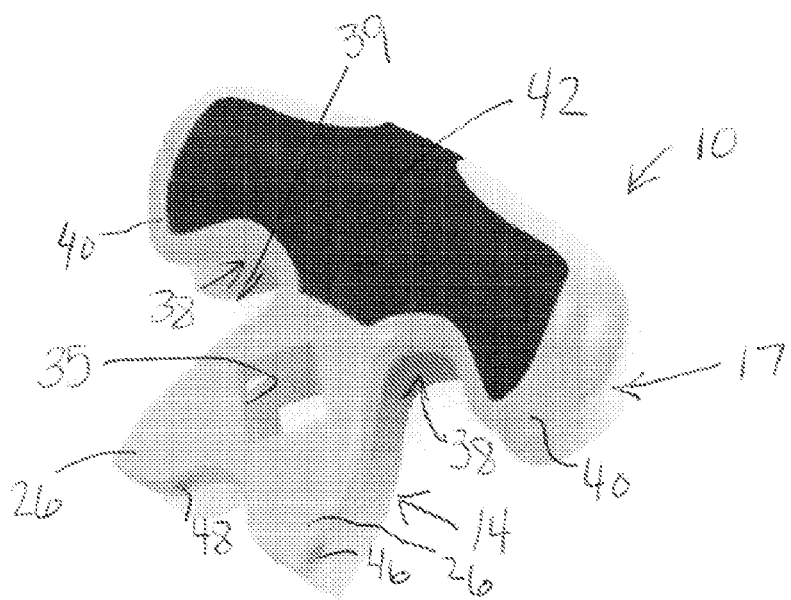
FIG. 1 is a perspective view of the ergonomic handle of the present invention.
Figure 2:
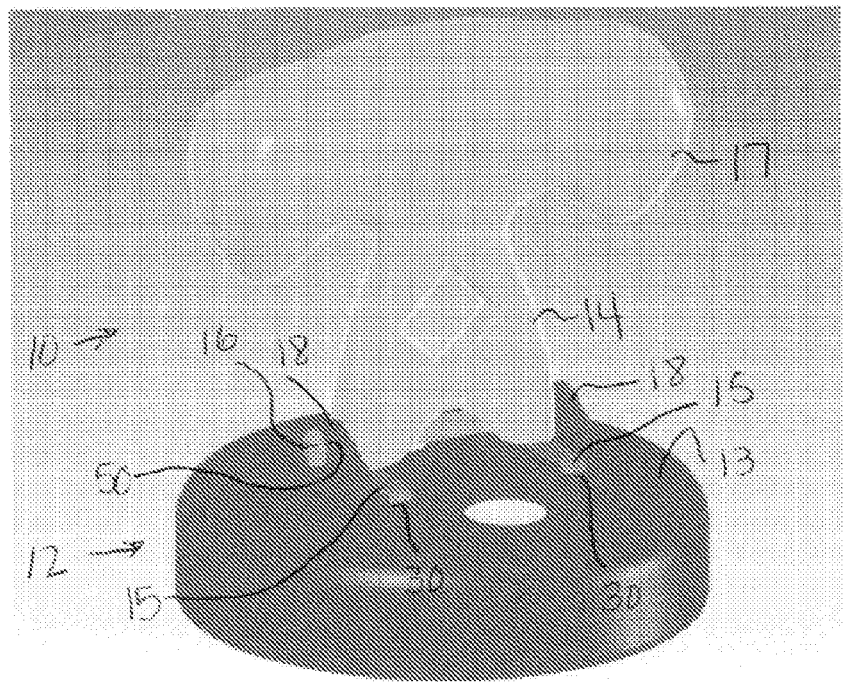
FIG. 2 is a perspective view of a fuel tank cap incorporating the ergonomic handle of FIG. 1, shown in an upright functional position thereof.
Figure 3:
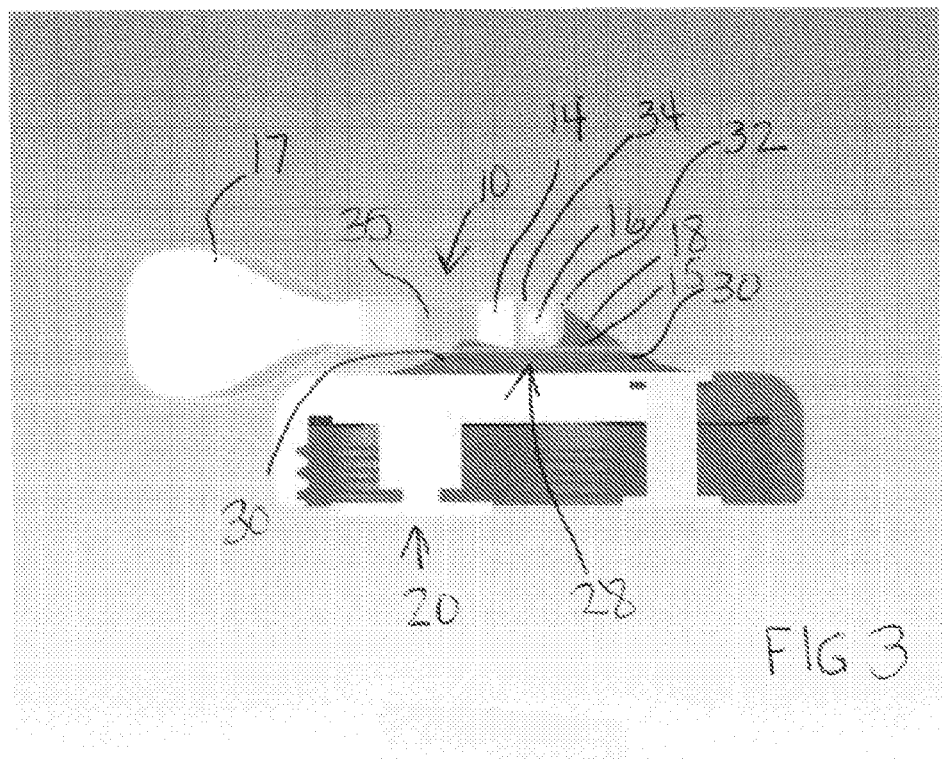
FIG. 3 is similar to FIG. 2 but shows, in cross section, the handle in a stowage position thereof, lying along a top surface of the cap.
Figures 4A, 4B, 4C:
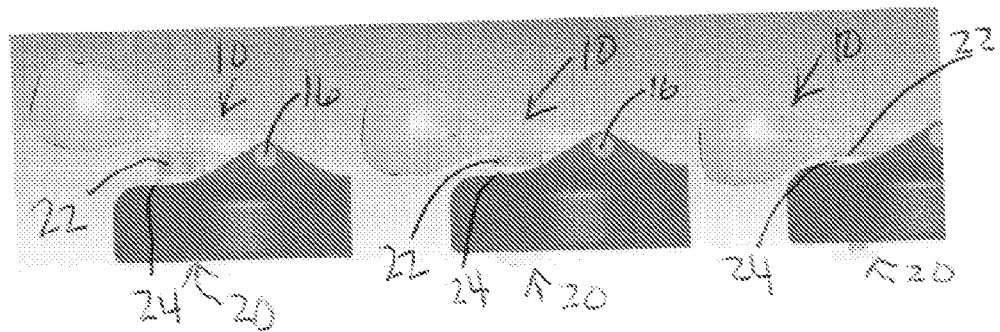
FIGS. 4A-4C provide a side view of the cap of FIG. 2, showing the handle automatically engaging and activating a locking mechanism of the cap, as the handle is pivoted from its functional position to its stowage position.
Figure 5:
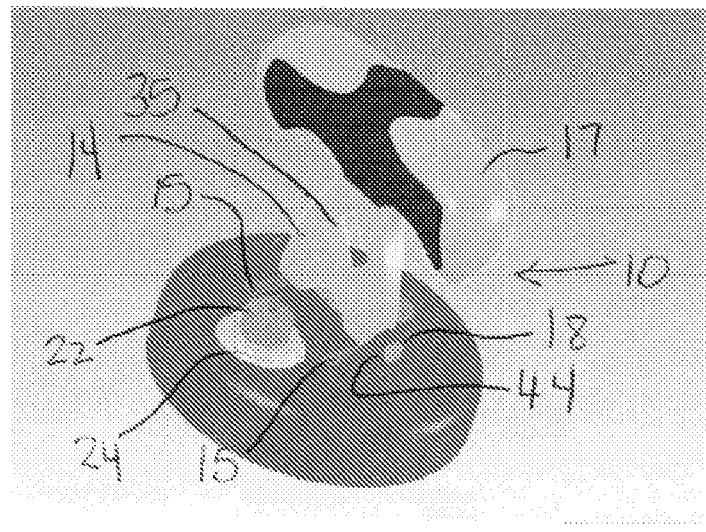
FIG. 5 is a perspective view of the ergonomic handle in its upright position, showing the surface of the graspable section covered with a frictional material, such as rubber.
Figure 6:
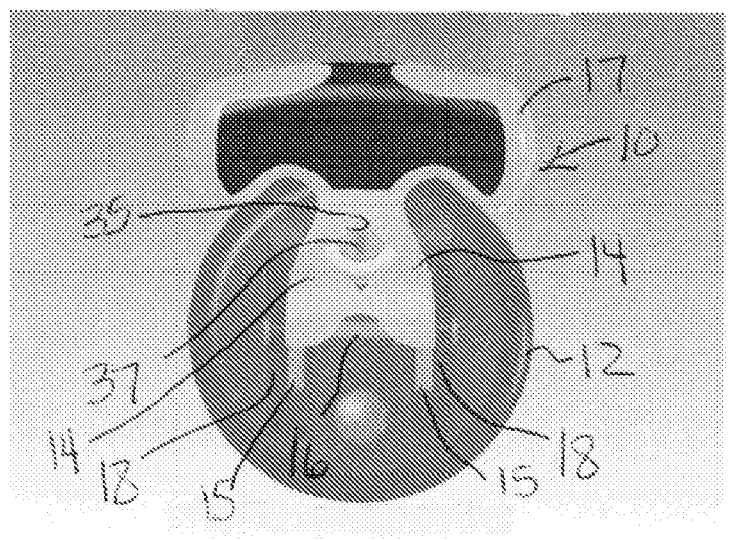
FIG. 6 is a perspective view of the ergonomic handle in its stowage position, showing a cutout in the handle base overlying the locking mechanism, to allow for use of a key therethrough to allow for disengagement of the locking mechanism if something should cause the handle to be unable to be pivoted to its functional upright position.
Figure 7:
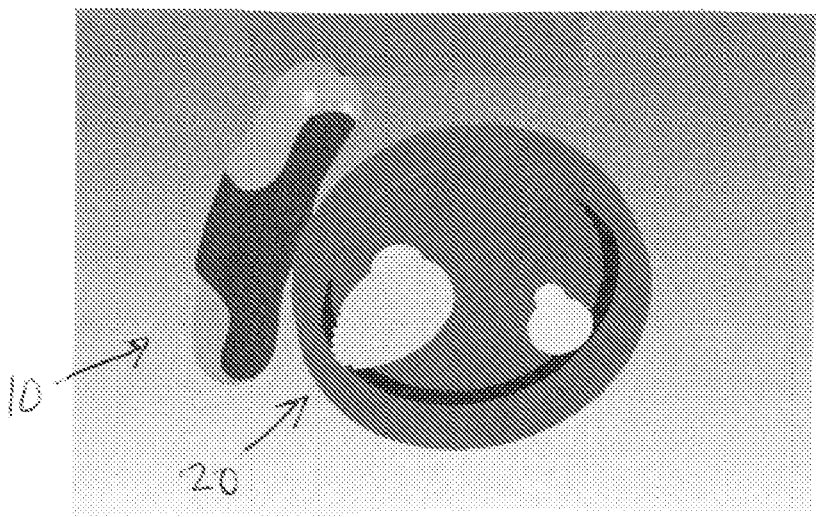
FIG. 7 is a bottom plan view of the cap showing the handle thereof in its stowage position, and a lock thereof automatically engaged by pivoting of the handle to such stowage position.

The ergonomic handle of the present invention is generally identified by the reference numeral 10. As illustrated in the Figures, the handle 10 is supported in two positions: straight up when in use, its functional position, and flat against a portion of a top surface 13 the cap 12 when not in use, its stowage position.

The handle 10 is lockable in the functional position, thus being stiff enough to allow for easier turning to screw the fuel cap 12 on or off. The handle 10 also preferably locks into the stowage position to prevent vibration, which causes wear and noise.

The handle 10 is comprised of a planar base 14 and a rounded graspable grip section 17 which lies in a plane perpendicular to the base, providing an overall T shape to the handle 10.

The handle 10 in the preferred embodiment is locked in place using two foils of spring steel 15 which utilize the geometry of the base 14 of the handle 10 to provide enough force to hold the handle 10 in either position yet still allow it to be pivoted about a pivot pin 16 easily, by means of which the handle 10 is pivotably engaged to upstanding side flanges 18 to either side of the handle 10, extending upwardly from the top surface 13 of the cap 12.

The cap 12 is secured to protect against fuel theft by a cam lock 20 which engages when the handle 10 is pivoted to its stowage position, pushing a barrel 22 of the lock 20 into its casing 24, as with a traditional spring lock.

In order to avoid dirt and ice rendering the handle 10 unusable, a cam-style mechanism 28 for supporting the handle 10 is provided. The mechanism 28 utilizes the A-shaped geometry of the base 14 with legs 26 thereon in conjunction with the spring steel foils 15 to provide enough resistance to hold the handle 10 upright or folded down, but not so much that it becomes difficult to use. This cam style mechanism 28 also minimizes handle 10 vibration, without adding to the complexity. Because of the elongate foil 15 geometry of the spring steel, the foils 15 can be flexibly engaged in slots 30 in the top surface 13 of the cap 12 before attaching the handle 10, without any bolts or pins. Further, to ensure that the handle 10 only folds over the cam lock locking mechanism 20 in its stowage position, each leg 26 is provided with a stop member 32 at a position on the bottom of the side 34 thereof opposite the cam lock locking mechanism 20. Thus the handle 10 can only be pivoted to one side of the pivot point, created by the pin 16.

The base 14 of the ergonomic handle 10 incorporates a cutout 35 therein positioned to overlie a keyhole 37 of the locking mechanism 20, to allow for passage of a key (not shown) therethrough to allow for disengagement of the locking mechanism 20 if something should keep the handle 10 from being pivoted to its functional upright position. The rounded graspable grip section 17 includes indentations on an underside 39 thereof for finger engagement and extended terminal end thumb tabs 40 to aid in applying torque to the cap 12.

It is further proposed to provide a coating of rubber 42 on graspable grip section 17 of the handle 10 to add comfort, as the rubber 42 provide a slip resistant surface, which will not be as cold or hot as a metal or hard plastic and thus be easier to grab in extreme weather conditions.

An analysis of the stresses resulting from the displacement of the spring steel foils 15 that maintain the handle 10 in desired position allowed for optimization of the force required to move the handle 10 relative to the force exerted by the spring steel foils 15 in maintaining handle 10 position. Such optimization, in a preferred embodiment, was achieved using 1095 spring steel for the foils 15.

Further, the configuration of the grip section 17, with inclusion of the finger indentations 38 and terminal thumb tabs 40, and its ergonomic configuration and substantially horizontal position relative to the base 14 and thus the cap 12, significantly decreases the amount of torque necessary for the hand to apply in twisting the cap 12 on and off, easing the burden often encountered in attempting to twist the cap 12 off.

It will also be understood that the pivot pin 16 passes through an opening 44 in a first pivot flange 18 on the top surface 13 of the cap 12, an aligned opening 46 in a first bottom leg 26 of the base 14, an aligned opening 48 in a second bottom leg 26 of the base 14, and an aligned opening 50 in a second pivot flange 18 on the top surface 13 of the cap 12 to pivotably engage the handle 10 to the cap 12.

In summary, the ergonomic handle 10 of the present invention is: comfortable to grab, requires low force for manipulation, is simple to use, adaptable to various trucks, low cost, reliable, durable, aesthetically pleasing, and minimizes interference with other systems. The force is decreased due to the handle shape, making the handle comfortable to grab, and easy to use in twisting the fuel cap 12 on and off. Further, the secondary benefit of locking the cap 12 in place when the handle 10 is placed in the stowage position thereof, is attained without any added manipulative requirement. Of course, it will be understood that the cap 12 with which the handle 10 may be used does not necessarily need to be locking. Further, the cap 12 may be vented or not. The primary benefit will still be provided by the handle 10, regardless of cap 12 configuration.

As describe above, the handle 10 of the present provides a number of advantages, some of which have been described above and others of which are inherent in the invention. Also, modifications may be proposed to the handle 10 without departing from the teachings herein. Accordingly the scope of the present invention is only to be limited as necessitated by the accompanying claims.

We claim:

1. A combination of an ergonomic handle and a locking fuel tank cap, the handle being pivotably engaged to a top surface of the cap and being lockably movable between a stowage position lying against a portion of the top surface of the cap and engaging against and activating a locking mechanism of the cap upon pivoting into such stowage position, and an upright functional position where the handle is positioned perpendicular to the cap, the handle comprising a planar A-shaped base section having a cutout therein overlying a lock of the locking mechanism of the cap and a horizontally disposed graspable top grip section wherein the planar A-shaped base section has a leg at each outer end edge of the planar A-shaped base section, each leg pivotably engaging the handle between spaced apart pivot flanges on the top surface of the cap, and wherein the cap is lockable and maintainable in position by a pair of spring steel foils, one spring steel foil being frictionally and compressibly engaged beneath each bottom leg of the planar A-shaped base portion.

2. The combination of claim 1 wherein the cutout is sized and configured to allow access to a keyhole of an underlying locking mechanism, when in a stowage position thereof, for use in unlocking the cap.

3. The combination of claim 2 wherein the cutout is diamond shaped.

4. The combination of claim 1 wherein the horizontally disposed graspable top grip section includes terminal thumb tabs that depend downwardly.

5. The combination of claim 1 wherein the cap is vented.

6. The combination of claim 1 wherein a pivot pin passes through an opening in a first pivot flange on a top surface of the cap, an aligned opening in a first short bottom leg of the base, an aligned opening in a second short bottom leg of the base, and an aligned opening in a second pivot flange on a top surface of the cap to pivotably engage the handle to the cap.

7. The combination of claim 1 wherein the cutout is not diamond shaped.

8. The combination of claim 1 wherein each spring steel foil is made of 1095 spring steel.

9. The combination of claim 1 being made of metal.

10. The combination of claim 1 being made of plastic.

11. The combination of claim 1 wherein the grip section is covered with a rubber coating.

12. The combination of claim 1 wherein the grip section is elongate.

13. The combination of claim 12 including indentations on an underside of the horizontally disposed graspable top grip section for fingers.

14. The combination of claim 13 having extended terminal end thumb tabs to aid in applying torque to the cap.

15. The combination of claim 1 wherein each leg is provided with a stop member on a surface thereof facing away from the locking mechanism of the cap to limit pivotability of the handle in a direction opposite the locking mechanism.

* * * * *